Nov. 12, 1957  H. C. WEBER  2,813,011
FLUID CONTACTING PROCESS AND APPARATUS
Filed May 14, 1954  2 Sheets-Sheet 1

INVENTOR:
Harold C. Weber

By: Chester J. Giuliani
Philip J. Liggett
ATTORNEYS:

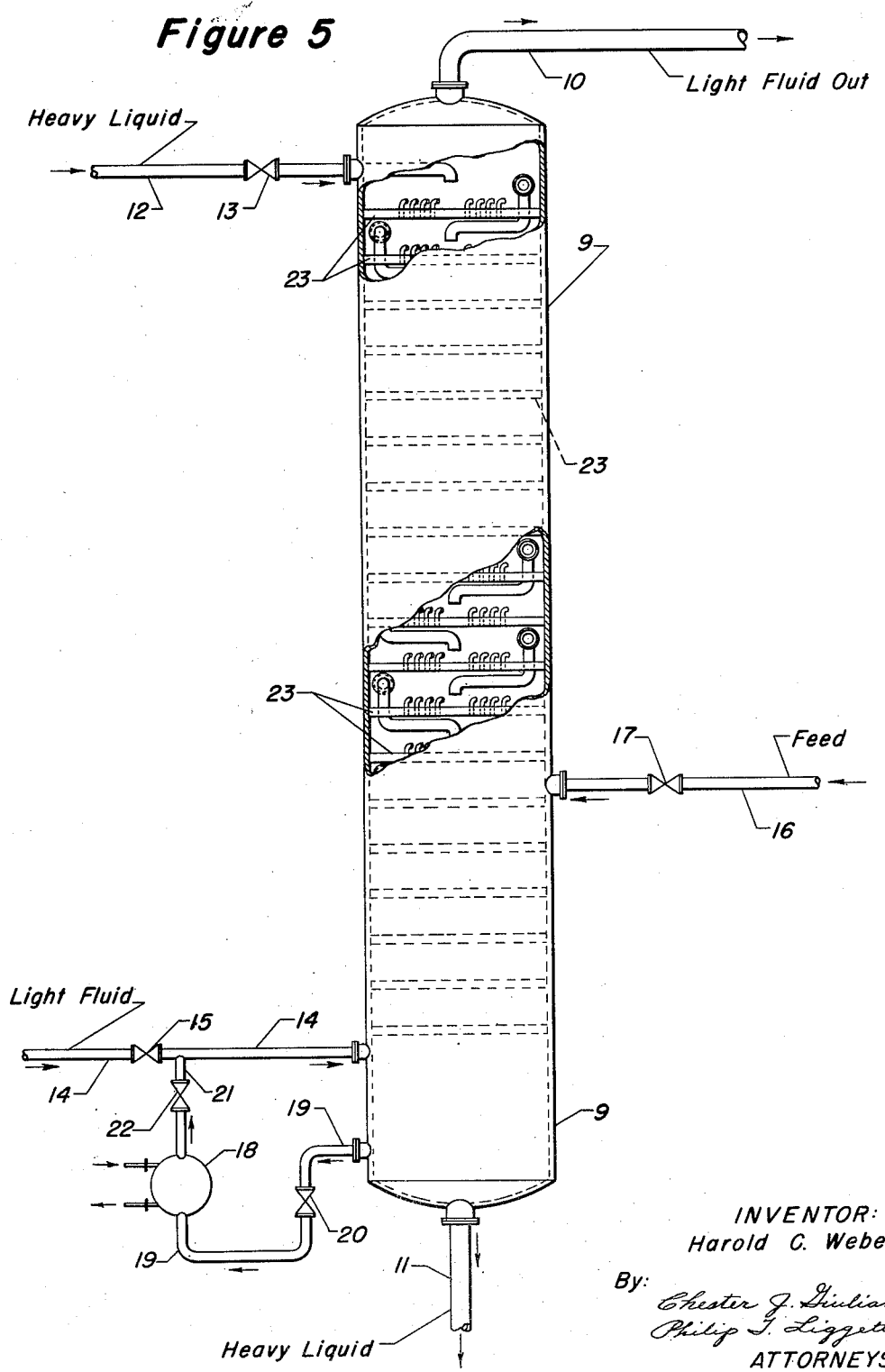

United States Patent Office 2,813,011
Patented Nov. 12, 1957

2,813,011

FLUID CONTACTING PROCESS AND APPARATUS

Harold C. Weber, Milton, Mass., assignor to Universal Oil Products Company, Des Plaines, Ill., a corporation of Delaware Application May 14, 1954, Serial No. 429,760

6 Claims. (Cl. 23—270.5)

This invention relates to an improved liquid-fluid contacting device and in particular to a novel and improved tray design for a multiple stage column for contacting a liquid with a fluid that is substantially immiscible therewith at prevailing conditions.

The novel device of this invention provides for radial countercurrent contact within one stage of a stage-wise countercurrent contacting device. As will hereinafter be discussed in greater detail the improved radial and lateral flow within each stage permits a foreshortening of each stage with the resultant process and structural benefits.

In one embodiment this invention relates to a process for contacting fluid with a heavier liquid which comprises introducing said heavier liquid into the central portion of a rotating mass of said fluid, disengaging said fluid from said heavier liqud and withdrawing it from the upper portion of said rotating mass and withdrawing the heavier liquid from the periphery of the rotating mass.

In another embodiment this invention relates to a stage-wise countercurrent process for contacting a fluid with a heavier liquid which comprises introducing said heavier liquid into the central portion of a rotating mass of said fluid maintained in one of said stages, disengaging said fluid from said heavier liquid and passing said fluid into a superimposed rotating mass of said fluid, passing said heavier liquid from the periphery of said rotating mass of fluid to the central portion of a rotating mass of said fluid maintained in a subjacent contacting stage, withdrawing said fluid from the uppermost contacting stage and withdrawing said heavier liquid from the lowermost contacting stage.

In another embodiment the present invention relates to a contacting tray assembly comprising in combination a tray member and an interstage transfer conduit which connects a point above the periphery of said tray member to a point below the center thereof and a plurality of passageways through said tray member, said passageways angled and adapted to discharge with circumferential and horizontal components.

In another embodiment the present invention relates to an apparatus comprising a series of superimposed tray members contained in a single housing.

This invention relates to any process wherein a fluid is contacted with a substantially immiscible liquid. Such processes may include fractionation wherein it is desired to contact a liquid with a gas and where the immiscibility of the liquid with the fluid is by virtue of boiling point difference at the prevailing conditions in the fractionation column. The process may also be applied to other liquid-gas contacting processes such as adsorption, defogging, stripping, etc. This apparatus is also extremely well adapted for contacting two liquids as in the case of liquid-liquid extraction or treating to remove impurities, etc. The process may also be used in applications wherein a fluidized solid or slurry is contacted with a liquid with various adaptations to accommodate the flow of such solids.

The tray assembly of the present invention consists of perforations in a plate-like member that fits snugly within a column, with the perforations adapted to discharge the light fluid into the next higher contacting zone in a manner to impart swirling or rotating motion to the mass of fluid in that contacting zone. This may be accomplished by means such as bubble caps which discharge only in one direction or by drilling perforations angularly through the plate member so that they all discharge in the same direction. The direction of discharge is preferably circumferential or perpendicular to the radius of the tray. It is of course, obvious that various adaptations of the direction of discharge may be employed to create particular flow patterns, however, it is equally obvious that tangential or circumferential inlets of the light fluid will produce the greatest amount of swirling or rotating action. With the heavier liquid introduced at the center of the swirling mass, gravity and centrifugal force will cause the heavier liquid to move downwardly and towards the periphery of the swirling mass thereby moving in a spiral flow from the center of the tray to its outer edge. The exact flow pattern of the heavier liquid through the swirling mass will of course depend upon many factors including the location of the inlet point and outlet point and the depth of the liquid on the tray. For example, when the heavier liquid is introduced immediately above the tray member and its outlet is intermediately spaced in the contacting zone, the average flow pattern of heavy liquid will be in a spiral upward with the greater proportion of its distance of travel in rotational movement rather than in lateral movement. When the inlet and outlet are at about the same level there will be no average upward or downward movement of the heavier liquid, however, there will be a great deal of rotational movement as well as lateral movement from the center to the edge of the contacting zone. It may be seen that in contrast to conventional contacting devices, the apparatus of the present invention provides for an elongated horizontal path of travel of one fluid through the other in the contacting zone.

Similar to the flow of heavy liquid, the rotational flow of fluid in each contacting zone causes a greater residence time of light fluid in this zone. The light fluid may move substantially in a circular path with little radial movement or it may have a general motion toward the center of the tray however, in either case the light fluid travels rotationally as well as upwardly to describe a rising spiral which provides a lengthened time of contact with the other fluid by the amount of rotational travel in the contacting zone.

From the foregoing discussion it may readily be seen that the height of a contacting zone may be substantially reduced by practicing the present invention in that the contact of one phase with the other in each contacting zone is by virtue of horizontal travel rather than by virtue of vertical travel of the fluids. The decreased height of each contacting zone will diminish the overall height of a colmun requiring a fixed number of contacting zones and will result in great savings in the material required for construction as well as other benefits associated with smaller equipment. In the case of a fractionation process, the present invention also increases the efficiency of contact in each zone by eliminating the troublesome problem of a hydraulic gradient. Thus in large diameter fractionation columns there might be as much as 4 or 5 inches of hydraulic gradient across the tray which results in inefficient contacting in that the perforations beneath the high level side of the tray are used to a much lesser extent than those beneath the low level side of the tray.

It may be seen that the swirling centrifugal action of the fluids on the trays in the present column will produce a stable hydraulic system in that the part played by gravity is substantially diminished.

Another advantage of the present process is that the novel construction of the apparatus creates a self-adjusting characteristic in the column. Thus when greater quantities of material are to be contacted, that is the throughput of the column is increased, the flow of light fluid which creates the swirling motion, is at higher velocity and the swirling becomes more violent which in turn increases the length of the path the material travels with the resultant increase in efficiency. The swirling centrifugal action also reduces foaming, tends to prevent entrainment and has other inherent advantages associated with centrifugal flow.

The particular structural features as well as the process of this invention may be more clearly explained with reference to the accompanying drawings which are presented to further illustrate the process and apparatus of this invention but are not intended to limit the invention to the particular embodiments herein described.

Figure 5 illustrates a complete apparatus employing a series of the aforementioned stages with at least some of the required auxiliary equipment shown in its proper relationship to the rest of the equipment.

Figure 1:
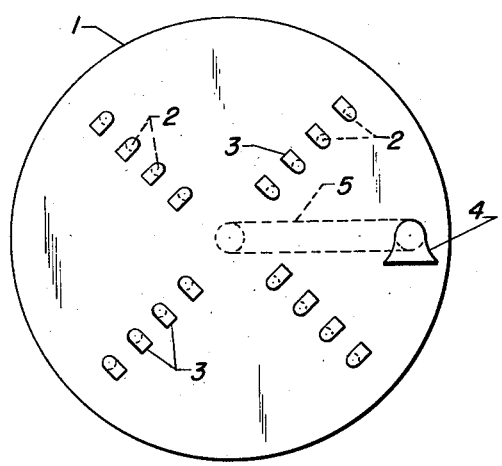
Figures 1 and 2 illustrate respectively a plan and elevational view of one embodiment of this invention with particular structural features for imparting swirling flow to the fluid and introducing the heavier liquid onto the next subjacent tray.

Referring now to the drawing, Figure 1 shows a plan view of one tray of a contacting tower with tray member 1 provided with perforations 2 which are adapted to discharge horizontally and perpendicular to the radius of tray member 1. In this particular embodiment the perforations are provided with short lengths of tubing 3 bent at right angles and facing to impart a counterclockwise flow to the fluid passing therethrough. Funnel member 4 which faces into the direction of flow opens into heavy liquid discharge conduit 5 so that the heavy liquid may enter the conduit with the additional impetus of impact head as well as by overflowing the opening.

Figure 2:
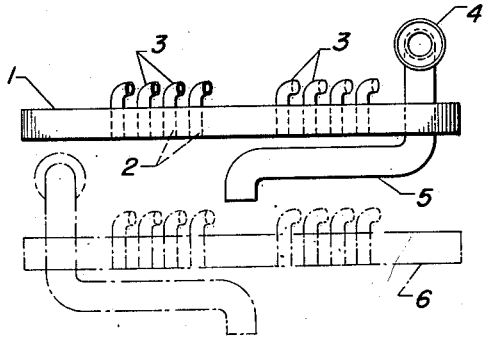

Figure 2 which is an elevational view of the tray of Figure 1 further illustrates the arrangement of the various apparatus features of Figure 1. Figure 2 illustrates the elevation of conduit 5 and funnel 4 which are disposed so that tubes 3 are beneath the surface of the heavy liquid maintained on the tray. Figure 2 also illustrates that conduit 5 discharges immediately beneath the center or at least substantially at the center of the tray. Figure 2 also shows in broken line the relative position of the next lower tray 6 which is identical to the tray illustrated above. The object of showing tray 6 is to indicate the relative position of the trays to illustrate for example, the diminished height of a contacting zone with respect to a similar contacting zone in a conventional contacting column.

Figure 3:
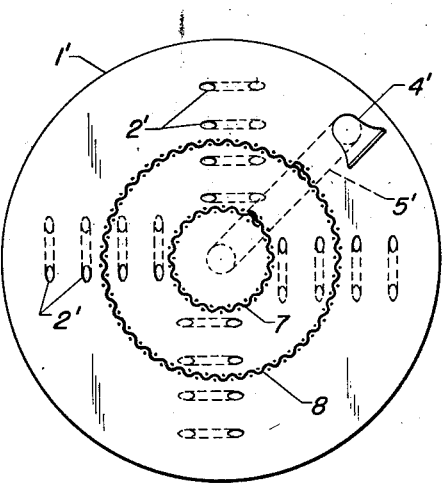
Figures 3 and 4 illustrate respectively a plan and elevational view of another embodiment which incorporates various structural modifications.
Figure 4:
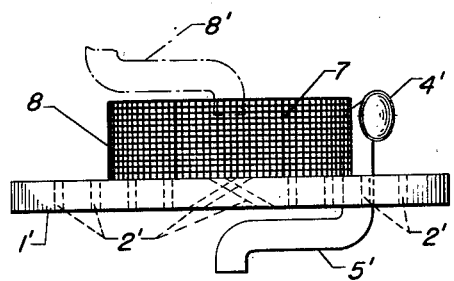

Figure 3 illustrates another embodiment of a tray assembly which performs substantially the same process as the tray shown in Figure 1. Referring now to Figure 3, tray member 1' containing perforations 2', funnel 4' and outlet conduit 5' in the hereinbefore discussed relationship to each other differs from the tray in Figure 1 in that the rotating motion of the fluid on the tray is imparted by the angularly drilled perforations 2'. Figure 4 illustrates the relationship of and disposition of perforations 2' to the rest of the tray. Figure 3 and 4 also illustrate at least one modification of this invention which comprises the placement of screens 7 and 8 to act as concentric baffles on the tray thereby causing the stream of heavy liquid introduced into the center of the tray to be broken into particles as a result of passing through the screen. Conduit 8' is shown in broken lines in Figure 4 to illustrate the relative position of the heavy outlet conduit to the screen and to illustrate the height of the screen in relation to the outlet conduit 5' disposed above the tray.

Referring to Figure 5 there is illustrated a contacting apparatus comprising a series of trays as illustrated in Figures 1 through 4. In Figure 5 housing 9 containing light fluid outlet 10 and heavy liquid outlet conduit 11 is provided further with heavy liquid inlet conduit 12 maintained in the upper portion thereof containing valve 13 and light fluid inlet 14 which contains valve 15 to control the flow. Housing 9 is also provided with feed inlet 16 containing valve 17 which in this embodiment is illustrated as entering a particular tray. However it is to be understood that feed conduit 16 may supply a header which will allow the feed to be passed into housing 9 on various trays individually or in combination. When used as a fractionation column the light fluid entering line 14 may comprise vapors of the feed which are produced by heater 18 which is provided with a thermal siphon contrived from lines 19 and 21 containing valves 20 and 22 respectively leading to and from heater 18. Heater 18 may be of conventional design and may obtain its heat from steam, hot liquid, other hot fluids, electricity or other suitable means.

From the broken section of housing 9 it may be seen that trays similar to those described hereinbefore are maintained in close space relationship to each other within the housing. Thus, trays 23 each containing the elements described in relation to Figures 1 through 4 are arranged in series with a general flow of light fluid up the column and heavy liquid down the column. It is of course, understood that the composition of the heavy liquid and light fluid continuously change as they pass through the column, the heavy fluid becoming increasingly rich in selected components of the lighter fluid and the lighter fluid becoming increasingly diminished in these selective components. For example, in the case of a fractionation, a feed containing both light and heavy components is introduced in housing 9 through line 16 and valve 17. The feed may be liquid, gaseous, or mixed. In considering, for example, a liquid feed, the liquid enters housing 9 on a tray member and is contacted thereon with a vapor which comprises the lighter components of the material previously fed to the column which descended the column to a hotter zone and were vaporized thence to begin rising through the column as vapor. The contact of this vapor with the liquid causes vaporization of the lighter components of the liquid feed with the resultant condensation of the heavier components of the light fluid vapor in the well known manner of a fractionating device. Thus, it may be seen that the light fluid, in the case of a fractionation, comprises the vapors from the feed while the heavy liquid is the higher boiling component of the feed. It is conceded that all components of the feed are miscible at ordinary conditions, however, at the conditions in the fractionator they are substantially immiscible forming a gas phase and a liquid phase.

In the case of a vapor feed, the material is introduced into housing 9 through line 16 and valve 17 and immediately upon entering housing 9 tends to rise through the column towards outlet 10. In each stage the vapor is contacted with a countercurrent stream of liquid, which liquid consists of material previously fed to the column and condensed in the upper portion thereof with the resulting descent therethrough. Here again the heavy liquid and the light fluid are but different components of the same feed and are immiscible by virtue of conditions maintained in housing 9. In the case of a vapor feed the heavy liquid is initially reflux which is material that passed overhead through line 10, was condensed, and is returned to the top of the column through valve 12 and line 13. The reflux is in reality light liquid, however, as it contacts the countercurrent vapor stream the light components in the reflux vaporize to condense the heavy components in the rising vapor thereby forming a descending liquid stream that contains different actual material but which is thermally equivalent to the original reflux stream.

When the column herein illustrated is to be used for liquid-liquid contacting as for example, when used to solvent extract an aromatic hydrocarbon from a hydrocarbon fraction with a solvent such as for example, aqueous diethylene glycol, the heavy liquid comprises aqueous diethylene glycol solvent and is introduced into the upper portion of housing 9 through line 12 and valve 13. As the heavy liquid descends the column by entering each stage at the center and passing centrifugally to the periphery from where it is introduced to the center of the next lower stage, it contacts a rising stream of hydrocarbon which contains greater or lesser amounts of aromatic hydrocarbons. The selective nature of the solvent causes the aromatic hydrocarbons to be preferentially dissolved so that the heavy liquid stream in each succeeding lower contacting stage is more enriched in aromatic hydrocarbons in that it contacts increasingly richer feed stock as it descends. The fed is introduced through line 16 and valve 17 into some intermediate portion in housing 9 and is immediately contacted with the descending stream of solvent which by this time is substantially enriched in aromatic hydrocarbons. By the well known principles of solvent extraction it may be seen that the hydrocarbon or raffinate stream discharging from housing 9 through outlet conduit 10 is substantially entirely non-aromatic. In order to provide for an enrichment of the solvent in aromatic hydrocarbons, there is provided an aromatic hydrocarbon reflux stream which in this case is the light fluid which enters the column through line 14 and valve 15. The reflux or light fluid stream will be obtained by removing the aromatic material from the solvent that is discharged through line 11 and passing at least a portion of it through line 14 and valve 15 to displace the small amounts of paraffinic or naphthenic hydrocarbons that remain in the solvent. In this particular embodiment reboiler 18 will not be used and may be blocked out from operation by the simple step of closing valves 20 and 22.

Other liquid-fluid contacting processes as hereinbefore discussed such as defogging, adsorption, scrubbing, treating in other ways, etc. may be similarly effected in the apparatus illustrated in Figure 5 and the detailed explanations given in reference to fractionation and liquid-liquid extraction are meant to be illustrative only rather than limiting.

There may, of course, be many modifications of the process and apparatus of the present invention which modifications are intended to be within the broad scope of this invention. These modifications may take the form of various arrangements and shapes of perforations to impart to the flow of light fluid the desired rotational components. The figures all illustrate 16 perforations in groups of four spaced 90° apart, however, these illustrations are not intended to show the optimum or even the desirable perforations either in number or in geometric configuration. Thus, it is contemplated that many more passageways will be desired through each tray disposed in other manners than radial alignment. It is also contemplated that the peripheral outlet pipe or interstage transfer conduit may be adjusted so that its outlet is raised or lowered or may be turned from facing into the stream to facing upward so that it is supplied by overflow. The opening may even be turned to face away from the direction of flow for some operations. The outlet of the interstage transfer conduit may also be raised or lowered to provide the desired flow pattern on the tray and the conduit may be embedded in the tray to prevent interruption of the flow pattern in each contacting zone by the baffling effect it has as illustrated. The concentric screen baffles illustrated in Figures 3 and 4 may be replaced with baffles comprising a series of slots, louvres, or the like to provide the desired turbulence on the tray or dispersion of the stream of heavy liquid. Another modification may be to arrange the tower so that the rotation of each tray is in an opposite direction from the rotation on the next successive tray. This arrangement will remove the necessity of designing a tower to withstand torque. It is also contemplated that the necessary valves, pumps, compressors, instrumentation, etc. will be used in the conventional manner to control the temperatures, pressures, flow rates, etc. within the column.

I claim as my invention:

1. A contacting tray assembly comprising in combination a tray member and an interstage transfer conduit which connects a point above the periphery of said tray member to a point below the center thereof, and a plurality of passageways through said tray member, said passageways spaced and adapted to discharge with circumferential and horizontal components, the upper end of said transfer conduit being provided with a funnel-like member disposed at an elevation above the discharge from said passageways and facing into the direction of discharge from said passageways.

2. The tray assembly of claim 1 further characterized in that said passageways are formed of conduits bent and positioned to discharge horizontally and circumferentially above said tray assembly.

3. The tray assembly of claim 1 further characterized in that said passageways comprise holes disposed at an angle from the vertical.

4. The tray assembly of claim 1 further characterized in that concentric baffle members are disposed on the upper surface of said tray member.

5. An apparatus for contacting a fluid with a heavier liquid which comprises in combination a confined chamber having a plurality of spaced tray assemblies which define a plurality of superimposed contacting sections, each tray assembly comprising a tray member, and an interstage transfer conduit connecting a point above the periphery of said tray member to a point below the center thereof and a plurality of passageways through said tray member, said passageways spaced and angled to discharge with circumferential and horizontal components, light fluid outlet means in the uppermost of said contacting sections and heavy liquid outlet means in the lowermost of said contacting sections, the upper end of said transfer conduit being provided with a funnel-like member disposed at an elevation above the discharge from said passageways and facing into the direction of discharge from said passageways.

6. A contacting tray assembly comprising a horizontal tray member having spaced perforations therethrough, short lengths of open-ended tubing extending upwardly from the perforations and bent at right angles to discharge with circumferential and horizontal components, a transfer conduit extending from a point above the periphery of said tray member to a point below the central portion of the tray member, and a funnel-like member on the upper end of said conduit disposed at an elevation above said tubing and facing toward the open ends of the bent portions of said lengths of tubing.

References Cited in the file of this patent

UNITED STATES PATENTS

| | | |
|---|---|---|
| 2,063,789 | Burk | Dec. 8, 1936 |
| 2,205,986 | Mangelsdorf et al. | June 25, 1940 |
| 2,286,503 | Ocon | June 16, 1942 |
| 2,474,006 | Maycock | June 21, 1949 |
| 2,665,975 | Ng | Jan. 12, 1954 |
| 2,672,406 | Carney | Mar. 16, 1954 |

FOREIGN PATENTS

| | | |
|---|---|---|
| 682,721 | Great Britain | Nov. 12, 1952 |
| 690,798 | Great Britain | Apr. 29, 1953 |
| 280,821 | Switzerland | May 1, 1952 |